United States Patent
Ko

(10) Patent No.: US 8,743,264 B2
(45) Date of Patent: Jun. 3, 2014

(54) CAMERA MODULE WITH REDUCED SIZE

(75) Inventor: Chun-Cheng Ko, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/450,500

(22) Filed: Apr. 19, 2012

(65) Prior Publication Data

US 2013/0141638 A1    Jun. 6, 2013

(30) Foreign Application Priority Data

Dec. 6, 2011  (TW) .............................. 100144768 A

(51) Int. Cl.
H04N 5/225 (2006.01)

(52) U.S. Cl.
USPC ............................ 348/335; 348/340; 348/373

(58) Field of Classification Search
USPC .......... 348/357, 335, 373–376, 340; 359/819; 396/72

See application file for complete search history.

(56) References Cited

U.S. PATENT DOCUMENTS

| | | | |
|---|---|---|---|
| 2003/0035228 A1* | 2/2003 | Takanashi | 359/819 |
| 2005/0285973 A1* | 12/2005 | Singh et al. | 348/374 |
| 2006/0274435 A1* | 12/2006 | Nomura et al. | 359/819 |
| 2007/0077049 A1* | 4/2007 | Tsai | 396/91 |
| 2008/0239519 A1* | 10/2008 | Lin | 359/819 |
| 2009/0067068 A1* | 3/2009 | Yu et al. | 359/823 |
| 2009/0161006 A1* | 6/2009 | Lee | 348/374 |
| 2009/0169198 A1* | 7/2009 | Chang | 396/529 |
| 2010/0277814 A1* | 11/2010 | Chen | 359/704 |
| 2011/0063495 A1* | 3/2011 | Tseng et al. | 348/357 |

* cited by examiner

Primary Examiner — Nhan T Tran
Assistant Examiner — Xi Wang
(74) Attorney, Agent, or Firm — Novak Druce Connolly Bove + Quigg LLP

(57) ABSTRACT

A camera module includes a lens barrel and a lens holder. The lens barrel includes a first tubular section and a second tubular section. The first tubular section extends from an end of the second tubular section. The outer diameter of the first tubular section tapers in a direction from the image side to the object side of the lens barrel. The lens holder includes a third tubular section and a fourth tubular section. The third tubular section extends from an end of the fourth tubular section. The outer diameter of the third tubular section tapers in a direction from an image side to an object side of the third tubular section. The lens barrel threadedly inserts into the lens holder and is held by the lens holder.

13 Claims, 3 Drawing Sheets

CAMERA MODULE WITH REDUCED SIZE

BACKGROUND

1. Technical Field

The present disclosure relates to camera modules and, particularly, to a camera module having a reduced size.

2. Description of Related Art

In the development of portable electronic devices, such as cell phones, miniaturization is the main trend. Therefore, it is desired to also miniaturize camera modules which are widely used in the portable electronic devices.

DETAILED DESCRIPTION

Embodiments of the disclosure will be described in detail, with reference to the accompanying drawings.

Figure 1:
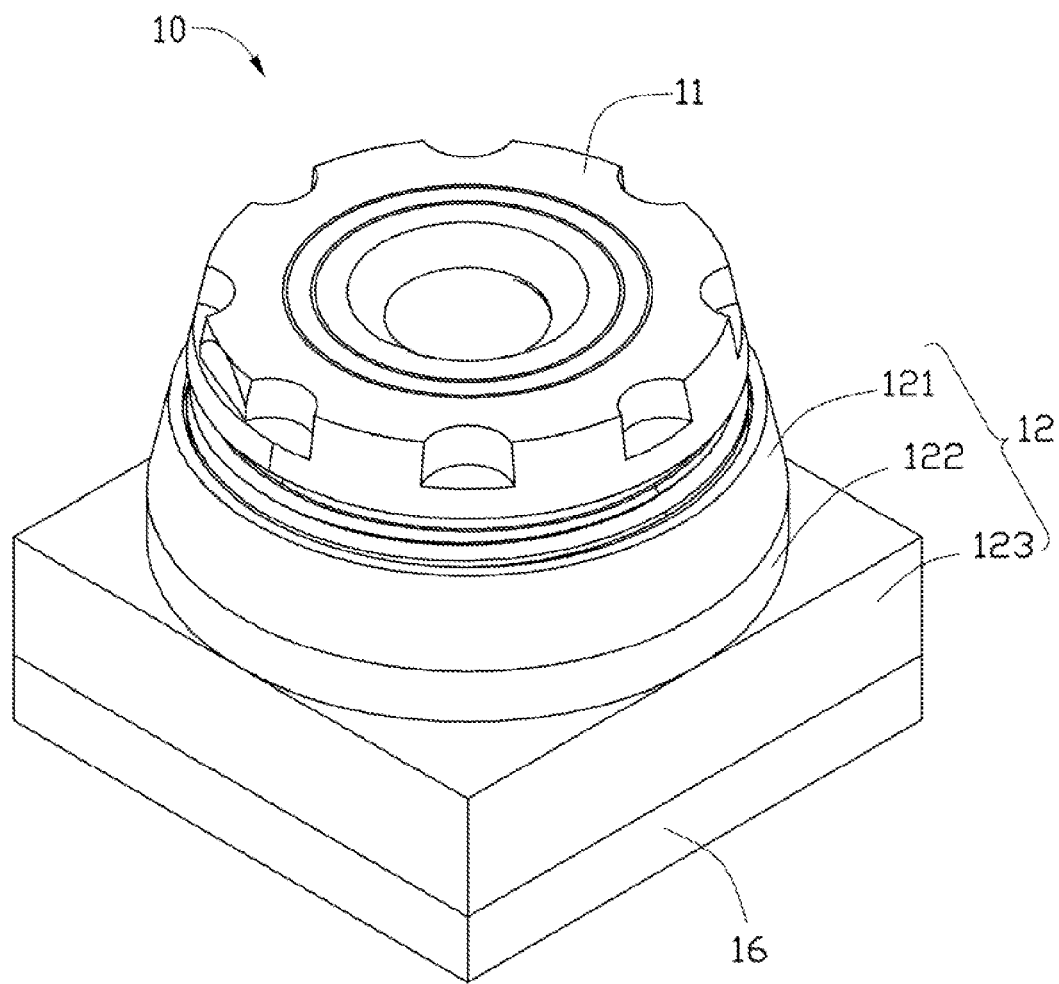
FIG. 1 is an isometric schematic view of a camera module, according to an embodiment.
Figure 2:
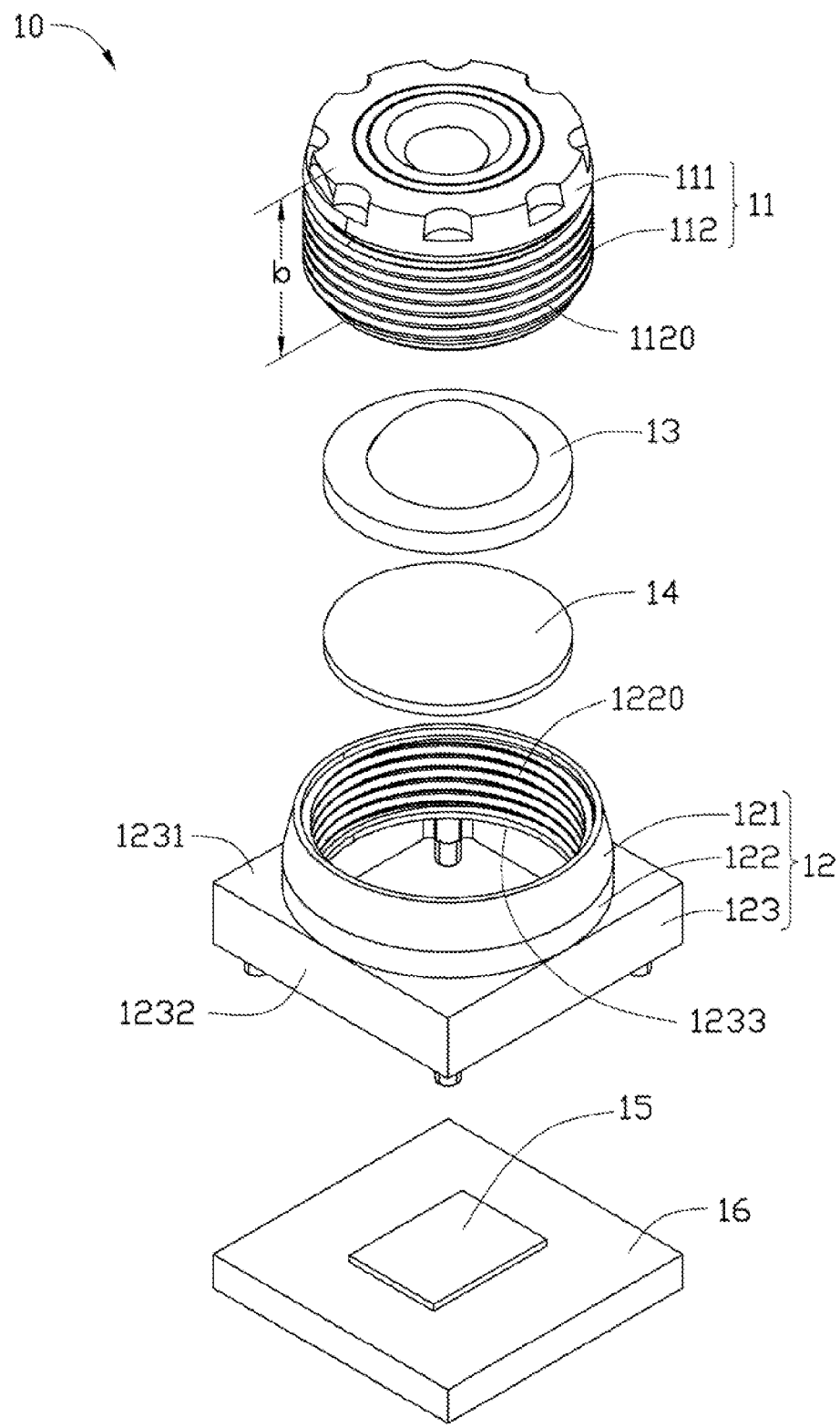
FIG. 2 is an isometric, exploded, schematic view of the camera module of FIG. 1
Figure 3:
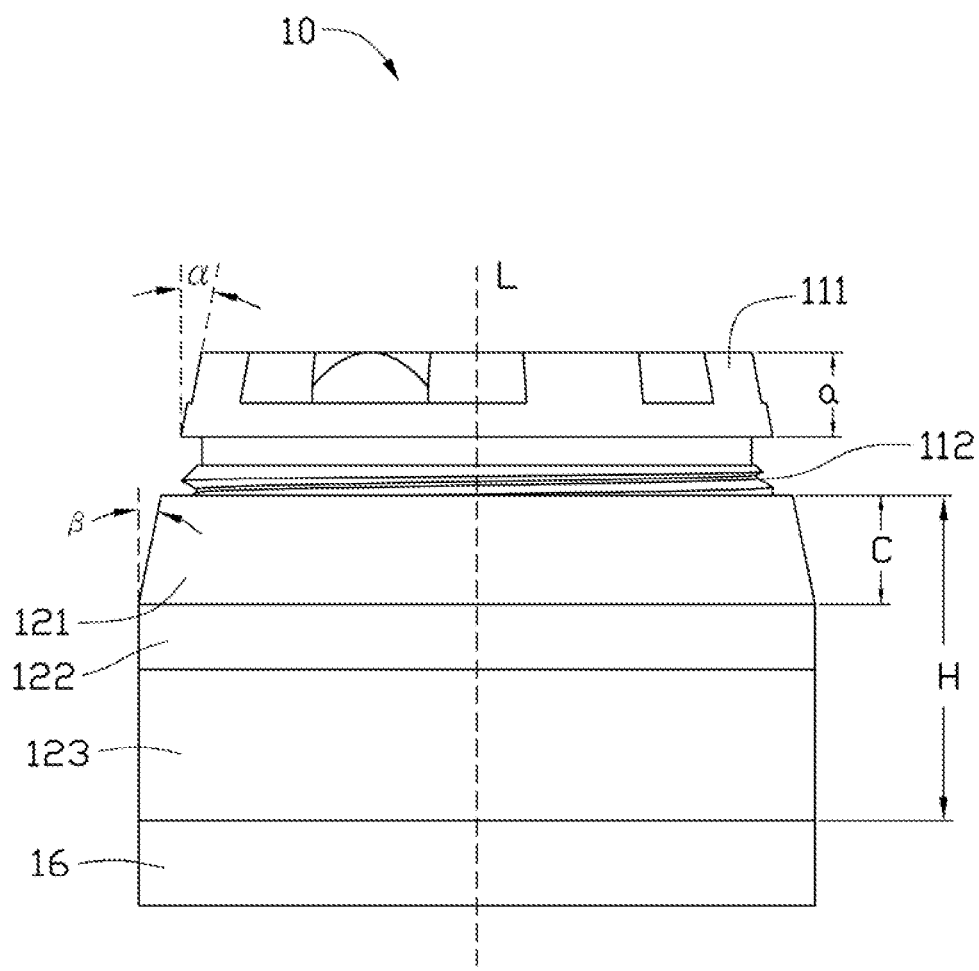
FIG. 3 is s a planar schematic view of the camera module of FIG. 1.

Referring to FIGS. 1-3, a camera module 10, according to an embodiment, includes a lens barrel 11, a lens holder 12, a lens 13, a filter 14, an image sensor 15, and a printed circuit board (PCB) 16.

The lens barrel 11 includes a first tubular section 111 and a second tubular section 112 arranged along the optical axis L of the camera module 10 in this order from the object side to the image side of the lens barrel 11. That is, the first tubular section 111 coaxially extends from the object-side end of the second tubular section 112. The inner diameters of the first tubular section 111 and the second tubular section 112 are substantially equal to each other. The outer diameter of the first tubular section 111 tapers in a direction from the image side to the object side of the lens barrel 11 at a first tapered angle $\alpha$, wherein $\alpha \leq 63.43°$. The second barrel 112 defines outer threads 1120 in the outer surface.

The lens barrel 11 satisfies the condition formula: $b=5.55a$, wherein a is the height of the first tubular section 111 along the optical axis L, and b is the height of the lens barrel 11 along the optical axis L. In this embodiment, $a=1$ mm and $b=5.55$ mm.

The lens holder 12 includes a third tubular section 121, a fourth tubular section 122, and a rectangular case 123. The rectangular case 123 includes a rectangular upper plate 1231 and four sidewalls 1232 extending from four respective edges of the rectangular upper plate 1231 The rectangular case 123 defines a circular through hole 1233 through the center of the rectangular upper plate 1231. The fourth tubular section 122 extends up from the outer periphery of the circular through hole 1233 and is opposite to the sidewalls 1232. The third tubular section 121 coaxially extends from the object-side end of the fourth tubular section 122 and is opposite to the rectangular case 123. The inner diameters of the third tubular section 121 and the fourth tubular section 122 are substantially equal to the diameter of the circular through hole 1233. The outer diameter of the third tubular section 121 tapers in a direction from an image side to an object side of the third tubular section 121 at a second taper angle $\beta$, wherein $\beta \leq 19.37°$ and $\beta < \alpha$. The lens holder 12 defines inner threads 1220 in the inner surfaces of the third tubular section 121 and the fourth tubular section 122.

The lens holder 12 satisfies the following condition formula: $H=3.01C$, wherein the C is the height of the third tubular section 121 along the optical axis L, and H is the height of the lens holder 12 along the optical axis L. In this embodiment, $H=3.85$ mm and $C=1.28$ mm.

In assembly, the image sensor 15 is positioned on the PCB 16. The lens holder 12 is also positioned on the PCB 16 and covers the image sensor 15 using the rectangular case 123. The lens 13 and the filter 14 are held in the lens barrel 11. The lens barrel 11 is threadedly held in the lens holder 12 via the engagement between the outer threads 1120 and the inner threads 1220.

As the first tubular section 111 and the third tubular section 121 tapers, the total size of the camera module 10 can be reduced.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A camera module, comprising:
   a lens barrel comprising a first tubular section and a second tubular section, the first tubular section extending from an end of the second tubular section, an outer diameter of the first tubular section tapering in a direction from an image side to an object side of the first tubular section; and
   a lens holder comprising a third tubular lens section and a fourth tubular section, the third tubular section extending from an end of the fourth tubular section, an outer diameter of the third tubular section tapering in a direction from an image side to an object side of the third tubular section, the lens barrel threadedly inserting into the lens holder and being held by the lens holder.

2. The camera module of claim 1, wherein inner diameters of the first tubular section and the second tubular section are substantially equal to each other.

3. The camera module of claim 1, wherein the tapered angle of the outer diameter of the first tubular section is smaller than or equal to 63.43°.

4. The camera module of claim 1, wherein the lens barrel satisfies the condition formula: $b=5.55a$, wherein "a" is a height of the first tubular section along an optical axis of the camera module, and b is a height of the lens barrel along the optical axis of the camera module.

5. The camera module of claim 4, wherein $a=1$ mm and $b=5.55$ mm.

6. The camera module of claim 1, wherein inner diameters of the third tubular section and the fourth tubular section are substantially equal to each other.

7. The camera module of claim 1, wherein the tapered angle of the outer diameter of the third tubular section is smaller than or equal to 19.37°.

8. The camera module of claim 1, wherein the tapered angle of the outer diameter of the third tubular section is smaller than that of the first tubular section.

9. The camera module of claim 1, wherein the lens holder satisfies the following condition formula: $H=3.01C$, wherein the C is a height of the third tubular section along the optical axis of the camera module, and H is a height of the lens holder along the optical axis of the camera module.

10. The camera module of claim 9, wherein $H=3.85$ mm and $C=1.28$ mm.

11. The camera module of claim 1, wherein the lens holder further comprises a rectangular case, the rectangular case comprises a rectangular upper plates and four sidewalls extending from four respective edges of the rectangular upper plate, the rectangular upper plate defines a circular through hole generally at the center thereof, and the fourth tubular section extends from an outer periphery of the circular through hole.

12. The camera module of claim 11, further comprising a printed circuit board and an image sensor, the image sensor being positioned on the printed circuit board, the lens holder also being positioned on the printed circuit board, with the rectangular case covering the image sensor.

13. The camera module of claim 1, further comprising a lens and a filter held in the lens barrel.

* * * * *